US012636128B2

(12) United States Patent
Moghanchi et al.

(10) Patent No.:  US 12,636,128 B2
(45) Date of Patent:      May 26, 2026

(54) ORTHODONTIC BRACKETS

(71) Applicant: Fab DT Limited, London (GB)

(72) Inventors: Samir Miresmaiel Moghanchi, London (GB); Paul de Gruchy Gaudin, London (GB); Terry Lionel Dickerson, London (GB)

(73) Assignee: Fab DT Limited, London (GB)

( * ) Notice: Subject to any disclaimer, the term of this patent is extended or adjusted under 35 U.S.C. 154(b) by 565 days.

(21) Appl. No.: 17/429,245

(22) PCT Filed: Feb. 6, 2020

(86) PCT No.: PCT/GB2020/050269

§ 371 (c)(1),
(2) Date: Aug. 6, 2021

(87) PCT Pub. No.: WO2020/161494

PCT Pub. Date: Aug. 13, 2020

(65) Prior Publication Data

US 2022/0133439 A1      May 5, 2022

(30) Foreign Application Priority Data

Feb. 6, 2019    (GB) ..................................... 1901633

(51) Int. Cl.
A61C 7/14          (2006.01)
A61C 7/16          (2006.01)
(Continued)

(52) U.S. Cl.
CPC ................ *A61C 7/22* (2013.01); *A61C 7/143* (2013.01); *A61C 7/16* (2013.01); *A61C 7/285* (2013.01)

(58) Field of Classification Search
CPC .. A61C 7/14; A61C 7/22; A61C 7/143; A61C 7/16; A61C 7/285
See application file for complete search history.

(56) References Cited

U.S. PATENT DOCUMENTS 3,423,833 A * 1/1969 Pearlman ................. A61C 7/14
                                                                433/8
3,721,005 A * 3/1973 Cohen ...................... A61C 7/14
                                                                433/16
(Continued)

FOREIGN PATENT DOCUMENTS

GB          2200847 A      8/1988

OTHER PUBLICATIONS

WIPO, PCT Form ISA210 International Search Report for PCT/GB2020/050269, pp. 4 (mailed Aug. 13, 2020).
(Continued)

*Primary Examiner* — Ralph A Lewis
(74) *Attorney, Agent, or Firm* — UltimatEdge IP Law Group, P.C.; Dean G. Stathakis

(57) ABSTRACT

An orthodontic bracket comprising: a base having a rear surface and a front surface, the rear surface configured to be adhered to a surface of a tooth (outside/labial and/or inside/lingual) in use; and an archwire holder which is rotationally mounted to the front surface of the base, the archwire holder being configured to be rotatable around an axis which is perpendicular to the base to within +/−30°, wherein the archwire holder comprises at least one slot configured to hold an archwire in use, and wherein the archwire holder is rotatable for receiving the archwire and applying a desired amount and/or orientation of tip and/or torque to the tooth in use.

14 Claims, 11 Drawing Sheets

(51) Int. Cl.

|        |            |
|--------|------------|
| *A61C 7/22* | (2006.01) |
| *A61C 7/28* | (2006.01) |

(56) References Cited

U.S. PATENT DOCUMENTS

| | | | | |
|---|---|---|---|---|
| 4,139,945 | A * | 2/1979 | DiGiulio | A61C 7/12 |
| | | | | 433/16 |
| 4,597,739 | A * | 7/1986 | Rosenberg | A61C 7/12 |
| | | | | 433/9 |
| 4,867,678 | A * | 9/1989 | Parker | A61C 7/12 |
| | | | | 433/8 |
| 5,954,502 | A | 9/1999 | Tuenge et al. | |
| 7,306,458 | B1 * | 12/2007 | Lu | A61C 7/14 |
| | | | | 433/9 |
| 9,655,694 | B2 * | 5/2017 | Cosse | A61C 7/287 |
| 9,949,806 | B2 * | 4/2018 | Cosse | A61C 7/02 |
| 2015/0182306 | A1 * | 7/2015 | Chen | A61C 7/143 |
| | | | | 433/9 |
| 2015/0342707 | A1 | 12/2015 | Fernandez San Pablo | |
| 2016/0143707 | A1 * | 5/2016 | Rahimi | A61C 7/146 |
| | | | | 433/24 |

OTHER PUBLICATIONS

WIPO, PCT Form ISA237 Written Opinion for PCT/GB2020/050269, pp. 7 (mailed Aug. 13, 2020).
UKIPO, Combined Search and Examination Report for GB 1901633.6, pp. 8 (mailed Jul. 18, 2019).
WIPO, PCT Form ISA210, International Search Report for PCT/GB2020/050269, pp. 4 (mailed Apr. 30, 2020).
WIPO, PCT Form ISA237, Written Opinion for PCT/GB2020/050269, pp. 7 (mailed Apr. 30, 2020).

* cited by examiner

View A

View B

View C

16

36

26

ORTHODONTIC BRACKETS

This application is a 35 U.S.C. § 371 U.S. national stage patent application which claims the benefit of priority and is entitled to the filing date of International Patent Application PCT/GB2020/050269, filed Feb. 6, 2020, an international patent application which claims the benefit of priority and is entitled to the filing date of GB Patent Application 1901633.6, filed Feb. 6, 2019, the content of each of which is hereby incorporated by reference in its entirety.

TECHNICAL FIELD

The present invention relates to an orthodontic apparatus and particularly to brackets for dental braces, orthodontic brace kits and orthodontic braces.

BACKGROUND

Orthodontics is a specialist field of dentistry which deals primarily with the diagnosis, prevention and correction of mal-positioned teeth and with the treatment of improper bites.

A typical orthodontic treatment routine will include an initial phase of diagnostics and planning where the nature of any misalignment or malocclusion is identified. A user's problems are identified and a treatment strategy is defined before being implemented.

The treatment strategy typically involves the use of an orthodontic apparatus for moving the user's teeth (hereafter the 'user' will refer to the person that has the orthodontic apparatus attached to them). Examples of orthodontic apparatus include devices such as dental braces (fixed and removable), retainers, plates and the like that can be used to help realign a user's teeth and then maintain them in a position that improves the user's dental health. A dental brace may be used to effect movement of a user's teeth whereas a retainer may be used after the dental brace has been used to ensure that the movement achieved by the dental brace is maintained. Other devices are used for a variety of different functions.

A typical dental brace includes a plurality of brackets, each of which are attached to a respective tooth by an adhesive such as bonding cement. Each bracket defines one or more features, the primary purpose of which is to retain and apply forces to a wire, known as an archwire. The features may be formed by cutouts or upstands in or on the bracket (hereafter the features will be referred to as 'slots'). The archwire is inserted into the slot of each bracket so as to exert a force on the bracket and thus on the tooth the bracket is attached to, thereby effecting movement of the tooth. The wire is normally retained in each bracket by a sliding gate, a polymer band or other retention method.

In relation to the above, it should be noted that healthy teeth respond to biomechanical pressures within a physiologic tolerance ($25 \text{ gcm}^{-2}$) of the hard and soft tissues they are invested in. Fixed appliances are a means of this force delivery mechanism. The application of force is mediated through an interaction between arch wires and the slots of the brackets bonded onto teeth. The dimensions of the bracket slots are orientated to express an angular prescription for the 3-dimensional positioning of individual teeth within the dental arches. These are termed "pre-adjusted" brackets and the values for the prescriptions have been determined relative to the assessment of averages within groups of untreated cases with aligned and well-fitting dentition. These average values have been further modified by various academics to describe their version of an idealised occlusion. The most popular include Andrews, Roth, Ricketts and McLaughlin, Bennett & Trevisi (MBT) prescriptions. Once selected, as large quantities of brackets will be required for the running of specialist practices, orthodontists usually stick to the one prescription they are happy with.

As such, it will be understood that a typical dental brace has pre-adjusted brackets that are used by a dentist to try to effect a predetermined movement of one or more teeth to move the teeth to positions that improve a user's dental alignment and/or or malocclusion (bite) and/or dental health. However, it is difficult for a dentist to estimate the force required to move a tooth to a particular position, particularly a desired position in three dimensions, and it is therefore difficult for a dentist to accurately select the correct pre-adjusted dental brackets to form the brace.

A typical course of orthodontic treatment may require a number of adjustments to the orthodontic apparatus being used to move the teeth. These adjustments give rise to the gradual movement of the teeth required by the treatment strategy. Without these adjustments, in many cases the treatment would be unsuccessful or only partially successful.

Since standard brackets are not adjustable in use when they are attached to a user's teeth there are two possible ways to adjust a brace during treatment. One option would be to remove one or more of the brackets and replace them with different brackets which have a different prescription or reposition the same bracket eccentrically or inverted. This involves breaking the adhesion of one of more brackets, removing them, and adhering new brackets or the same bracket at desired locations and with desired pre-adjustments. An alternative option is to perform bending of the archwire to change the forces on particular brackets in the desired manner. However, such a procedure is difficult, time consuming, and requires a significant amount of skill on the part of the dentist to achieve the desired change in magnitude and direction of force on each tooth. Furthermore, it can be difficult to change a force in a desired manner on a specific tooth without adversely affecting the force on other teeth. Further still, due to the position of the various elements of the orthodontic apparatus in the user's mouth, the adjustment process is not easy to carry out and can be uncomfortable for a user. Also, repeated adjustment may cause breakage of one or more components of the brace or otherwise components may become immovable during the adjustment process.

As such, it will be understood that problems are associated with pre-adjusted brackets, most notably unwanted tooth movement. The alveolar bone that the teeth are invested in responds to pressure wherever this is applied. There are no fixed points for the purposes of "anchorage" to push or pull against. Hence, from the very point of force delivery, depending on cross sectional dimensions of the arch wire, most/all of the prescriptions will start to become expressed resulting in movements which may not be required at that particular stage of treatment, thereby necessitating "round tripping" to recover the lost original position, termed "loss of anchorage", hence increasing treatment time.

Furthermore, the prescriptions are not sensitive to ethnicity nor to individual anatomic variation within a particular ethnic group. Imposition of average Caucasian values often leads to incomplete treatment requiring further intervention to conclude a case to a satisfactory standard. Incomplete treatment often results in post treatment relapse which may require future re-treatments.

In relation to the above, it shall also be noted that a typical course of orthodontic treatment will require adjustment of one or more teeth in one or more of a number of different types of movement. These include tip, torque, levelling and in-out translation which are terms of art in this field of orthodontic technology. The different types of movement can be defined relative to a plane defined by a surface of the tooth on which a bracket is adhered. It may be noted that this surface plane will also correspond to the plane of the base of bracket which is adhered to the surface of the tooth. Tip or tipping involves rotating a tooth around an axis substantially perpendicular to the surface of the tooth to which the bracket is adhered. This will change the in-plane orientation of a long axis of the tooth. In contrast, torque or torqueing involves rotating the tooth around a substantially horizontal axis which is substantially parallel to the surface of the tooth. This will change the out-of-plane orientation of the long axis of the tooth. Levelling involves movement of the tooth relative to the plane of the user's bite. Finally, translation involves moving a tooth without changing the angular orientation of the long axis of the tooth.

U.S. Pat. No. 4,597,739 relates to a bracket system for adjusting torque, but not tip. However, the system disclosed in U.S. Pat. No. 4,597,739 relies on interchange of parts providing different levels of torque, which is inconvenient and subject to possible failure of the connections between the various interchangeable components. GB 2200847 relates to an orthodontal bracket that provides no enabled means for adjusting torque. Instead, the torque adjustment envisaged by the disclosure of GB 2200847 is merely the conventional means that rely on manipulation of the archwire, and other accessories, with the associated problems discussed above. U.S. Pat. No. 7,306,458, US 2015/0342707 and US 2016/0143707 relate to orthodontal brackets that provide no disclosure of torque adjustment.

This document describes a form of a bracket which is adjustable to provide one or more of the aforementioned types of movement and to enable adjustment of applied force on a tooth by adjustment of the bracket configuration. The adjustment may be made at any time during manufacture, by the dentist prior to fitting to the user, or while the bracket is fitted to the user. It is a further aim to provide an adjustable bracket which is readily adjusted in a quick and easy to use fashion while enabling accurate control to adjust the amount and direction of force, and resultant movement of a tooth, in a desired manner during treatment.

SUMMARY

According to an aspect disclosed herein there is provided an orthodontic bracket comprising: a base having a rear surface and a front surface, the rear surface configured to be adhered to a surface of a tooth (labial and/or lingual surface) in use; and an archwire holder which is rotationally mounted to the front surface of the base, the archwire holder being configured to be rotatable around an axis which is perpendicular to the base to within +/−30° (optionally +/−20°, +/−10°, +/−5°, or +/−3°) wherein the archwire holder comprises at least one slot configured to hold an archwire in use, and wherein the archwire holder is rotatable for receiving the archwire and applying a desired amount and/or orientation of tip and/or torque to the tooth in use. Both tip and torque are adjustable by rotating the archwire holder and/or optional other components around the same single axis of movement.

The orthodontic bracket of the invention does not require the exchange of the archwire holder to change the desired amount and/or orientation of tip and/or torque to the tooth in use.

According to one configuration, the archwire holder comprises a plurality of slots disposed at different angular orientations, each slot being configured to hold an archwire in use, and wherein the plurality of slots each have a different configuration to apply a different amount and/or orientation of tip and/or torque to the tooth in use, the archwire holder being rotated to select a desired slot for receiving the archwire in order to apply a desired amount and/or orientation of tip and/or torque to the tooth in use.

The "desired amount and/or orientation of tip and/or torque" is the amount and/or orientation of tip and/or torque that is needed to provide the direction and amount of force required for the treatment strategy as assessed by the orthodontist. This will vary depending on a variety of factors, for example the degree of misalignment or malocclusion and/or will vary as the treatment strategy progresses. The "desired slot" is the slot that best provides the desired amount and/or orientation of tip and/or torque.

The archwire holder may be left free to rotate, or be constrained or locked in place, either permanently or via a releasable mechanism. For instance, the bracket may contain a releasable locking mechanism configured to allow the archwire holder to be rotated around the axis of rotation and locked in a plurality of angular orientations, the archwire holder being rotated and locked in place to select the desired channel for receiving the archwire in order to apply the desired amount and/or orientation of tip and/or torque to the tooth in use. The archwire holder may be continuously adjustable via rotation or may have a finite set of fixed angular increments. Alternatively, a permanent locking mechanism such as welding or a semi-permanent mechanism such as adhesive bonding may secure the angular rotation. Furthermore, a biasing mechanism (e.g. spring mechanism) or friction mechanism may be provided to resist free-rotation of the archwire holder to select angular orientations of the archwire holder to impart rotational force in place of a strict locking mechanism. Such mechanisms may be used in combination.

The orthodontic bracket allows the forces imparted on a particular tooth of a user to be adjusted to the desired degree by a dentist. In addition, the forces applied to a tooth by the orthodontic apparatus can be customised for that particular tooth, which results in more effective realignment of the tooth into a position that improves the user's dental health and avoids unwanted movement. The orthodontic bracket thus enables a desired movement of a tooth within the bone envelope.

A new system has thus been devised providing an adjustable bracket configuration to allow manipulation of tooth movement in the desired direction and at the time required. A bracket system is thus provided which reduces/eliminates unwanted tooth movement hence reducing round tripping and treatment time. Used in conjunction with a customised prescription, this reduces post treatment relapse with precise positioning of the teeth within an optimum bone envelope. The system can be used in conjunction with imaging (e.g. CT or MRI) of the user's teeth and jaw to customise the brackets and hence treatment.

According to certain configurations, the adjustable bracket enables manipulation of the tip and torque angles via adjustable slot geometry whereas the third dimension "in-out" can be built into the thickness of the bracket base as required.

The archwire holder may comprise a plurality (n) of orientations for selecting the required slot. For example, the archwire holder may be provided with three slots at 120° orientations. The archwire holder can be rotated between the 120° orientations to select a suitable slot to hold the archwire. Each slot may be labelled to give an indication of the amount and/or orientation of tip and/or torque which will be applied to the tooth if the slot is selected. In this way, the orthodontic bracket can be adjusted to apply a desired amount and/or orientation of tip and/or torque to a tooth in use. The slots may be disposed across the rotational axis of the archwire holder or offset from the rotational axis.

The above-described rotation of the archwire holder around 360° in order to select a specific one of the plurality of slots may be termed gross rotation. The archwire holder (and associated locking or angular control mechanism) may be further configured to comprise a plurality of sub-positions for each of said n orientations for varying the angle of a selected slot. That is, for each gross orientation there is provided a plurality of fine rotation positions which enables a selected slot to be varied in terms of its angular orientation around the rotational axis. This fine rotation may be applied before or after the archwire has been inserted into the selected slot. As such, this configuration enables two types of adjustment: (i) adjustment via selection of one of the plurality of slots; and (ii) fine adjustment of the selected slot.

While the aforementioned example includes an archwire holder provided with three slots at 120° orientations, other configurations are envisaged having more or fewer slots. An archwire holder may even be provided with only a single slot. This slot can have two different orientations by rotating through 180° and thus can still provide two different tip and/or torque configurations. Further values can be provided by including fine adjustments to the two 180° orientations.

Furthermore, the archwire holder can be configured to be rotatable only around the axis which is substantially perpendicular to the base. Such a configuration avoids the need for more complex configurations in which different types of adjustment require rotation around different axes of rotation. More complex configurations having more than one rotational axis increase the cost and complexity of the brackets. Furthermore, more complex configurations can be difficult to adjust in use and can be prone to malfunction or breakage.

In one configuration the plurality of slots is configured to provide different amounts and/or orientations of torque. One of the slots is selectable to receive the archwire in use via rotation of the archwire holder. The selected slot is thus oriented for receiving the archwire to apply the desired amount and/or orientation of torque. As such, in this configuration the different slots give different torque. This can be achieved, for example, by providing that each slot has two side walls and a floor, and the floor and/or side walls of each slot have different angular orientation in order to provide different amounts and/or orientations of torque. In general, the internal shape/orientation of each slot can be modified to generate differing torque.

Furthermore, for each slot the archwire holder can be configured to enable selection of a plurality of angular orientations of the slot when the archwire is disposed in the slot to adjust the amount and/or orientation of tip. That is, the archwire holder has a plurality positions corresponding to selection of a slot and a plurality of positions for the selected slot to adjust the amount and/or orientation of tip. When combined with the previous configuration the two types of adjustment are: (i) adjustment of torque via selection of one of the plurality of slots; and (ii) adjustment of tip via fine rotation of the selected slot. It is also envisaged that the slots can be re-configured such that, for example, tip is adjusted via selection of one of the plurality of slots and/or adjustment of torque is achieved via fine rotation of the selected slot.

One particular advantage of embodiments of the invention as described herein is that both tip and torque can be adjusted by rotation of the archwire holder around a single axis of rotation. No swapping or replacement of parts is required to change the level of tip and/or torque using embodiments of the invention. Instead, all that is required is rotation of the archwire holder to dial in a different level of tip force and/or torque force. In the case of tip adjustment, removal of the archwire may not be required. Torque adjustment may require removal of the archwire, selection of a different torque force by rotation of the archwire holder, and replacement of the archwire.

In embodiments of the invention, the archwire holder is configured to be rotatable only around the axis which is perpendicular to the base to within +/−30°.

According to certain configurations, the slots are oriented in a direction generally perpendicular to the base. That is, the direction from a floor of each slot to an opening or upper part of the slot is in a direction generally away from the base of the orthodontic bracket. The specific angular orientation will vary according to the amount of tip or torque which is to be applied to a tooth. For example, the slots may be orientated substantially perpendicular to the base or within an angular orientation +/−45° (optionally, +/−35°) of perpendicular. In this configuration each slot has side walls which also extend generally away from the base of the orthodontic bracket. An insertion direction for introducing the archwire into the slots is generally towards the base of the orthodontic bracket, e.g. within an angular orientation +/−45° (optionally, +/−35°) of perpendicular to the base.

According to an alternative configuration, the slots can be oriented in a plane generally parallel to the base to within, for example, +/−45° (optionally, +/−35°) for insertion of the archwire. In this configuration, the direction from a floor of each slot to an opening or opposite side of the slot is in a direction generally parallel to the base plane of the orthodontic bracket, e.g. within an angular orientation +/−45° (optionally, +/−35°) of parallel to the base. In this configuration each slot has side walls which also extend generally parallel to the base of the orthodontic bracket. An insertion direction for introducing the archwire into the slots is also generally parallel to the base of the orthodontic bracket.

Each slot is not required to have a continuous floor and side walls. For example, each slot can be formed from two or more sub-slots aligned to receive the archwire. The sub-slots can be considered as a single slot with a discontinuous floor and/or side walls. For example, in the case that the archwire holder is of a cylindrical shape, projections around the cylindrical archwire holder can form a turret-like configuration defining the sub-slots with two opposing and aligned sub-slots on opposite sides of the cylindrical archwire holder forming a slot into which the archwire can be disposed in use.

In embodiments of the invention, the archwire holder is configured to be free to rotate, or have its rotary position constrained by the archwire, a flexible mechanism, a positive location mechanism, a weld and/or an adhesive.

The orthodontic bracket may further comprise an archwire retainer which is disposed over the archwire holder to retain the archwire in the archwire holder in use. The archwire retainer may take different forms. For example, the archwire retainer may be in the form of a sliding gate, hinged gate, retention band, ring, or affixable (e.g. snap-on) cap. One advantage of a cap configuration is that the cap can prevent debris from entering the interior parts of the orthodontic bracket. A retention cap also provides an externally facing surface which can function to hide internal parts of the orthodontic bracket increasing the aesthetic appeal of the bracket. The externally facing surface can be decorated with a colour, pattern, or the like to increase aesthetic appeal and/or personalize the bracket for an individual user.

In a further aspect of the present invention there is provided an orthodontic brace kit comprising: a plurality of orthodontic brackets as described herein; and one or more archwires having a cross-sectional shape for fitting into the slots of the orthodontic brackets.

In yet a further aspect of the present invention there is provided an orthodontic brace comprising: a plurality of orthodontic brackets as described herein; and an archwire disposed in the slots of the orthodontic brackets.

In embodiments of the invention, the bracket further comprises a spring, wherein the locking mechanism of the invention comprises the spring, which is resiliently biased against cooperating components on the base and/or the archwire holder to lock the parts in place in use.

BRIEF DESCRIPTION OF THE DRAWINGS

To assist understanding of the present disclosure and to show how embodiments may be put into effect, reference is made by way of example to the accompanying drawings in which:

FIG. 10 shows an orthodontic bracket configuration including: two slots for the archwire, in this case at 90 degrees to each other, each slot having different torque angles giving the potential for up to four torque angles that can be selected (the two slots can be oriented in an upwards or downwards direction giving the four torque settings); and a spring clip that is used to positively locate the tip and torque angle selections, the illustration showing three possible tip angles for each torque setting although more or less of either or both could be designed in.

Figure 1:
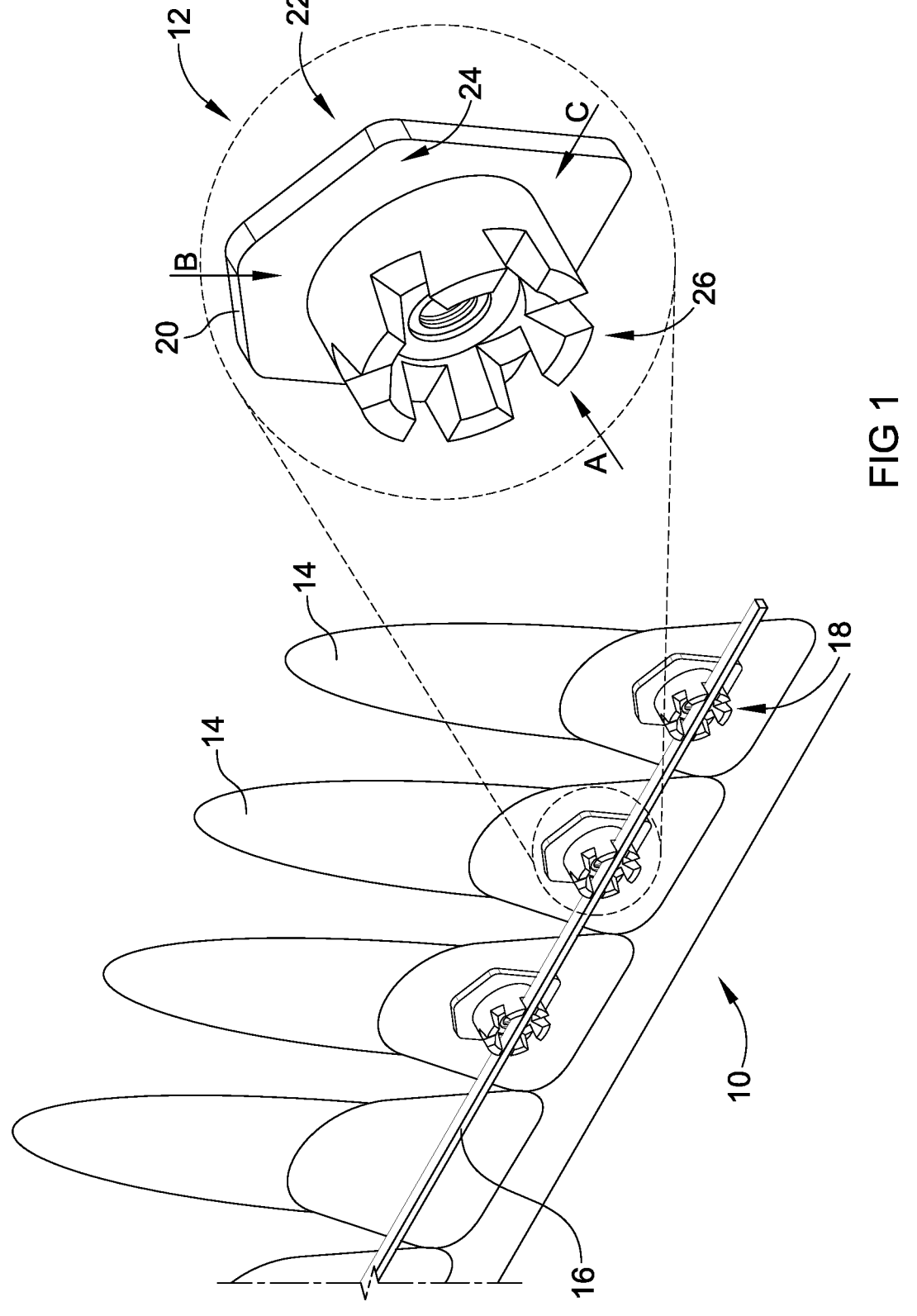
FIG. 1 illustrates a portion of an orthodontic brace including three adjustable brackets mounted to respective teeth with an arch wire located in slots of the adjustable brackets—the figure includes a more detailed view of one of the adjustable brackets.

In the figures, like reference numerals have been used for like parts to aid comparison of the different embodiments. It will be understood that the figures illustrate how the concepts described herein can be embodied in practical orthodontic devices. These figures illustrate only some possible configurations and other variations and combinations can be envisaged.

DETAILED DESCRIPTION

A typical conventional dental brace includes a plurality of orthodontic brackets, each of which are attached to a respective tooth by an adhesive such as bonding cement. Each bracket is configured to provide a substantially horizontally oriented slot (in use when the bracket is mounted to a user's tooth). A wire known as an archwire is inserted into the slot of each orthodontic bracket so as to exert a force on the bracket and thus on the tooth the bracket is attached to, thereby effecting movement of the tooth. A gate or other retention means can be attached to each bracket to retain the archwire in the slot. The components of the orthodontic bracket are typically formed from stainless steel or a ceramic material. The archwire is typically formed from a metal or an alloy such as nickel-titanium or stainless steel. Standard orthodontic brackets are not designed to be adjustable.

As described in the background section, a typical course of orthodontic treatment may require a number of adjustments to the orthodontic apparatus being used to move the teeth. Since standard orthodontic brackets are not adjustable in use when they are attached to a user's teeth there are two possible ways to adjust an orthodontic brace during treatment: replace one or more of the orthodontic brackets with a bracket having a different pre-configured setting; or bend the archwire to change the forces on particular brackets in the desired manner. Neither of these procedures is ideal in terms of time, difficulty, discomfort, precision, and/or reliability.

The present specification describes adjustable brackets which can be readily adjusted to reliably adjust the amount and direction of force, and resultant movement of a tooth, in a desired manner during treatment. The arrangements described herein enable a manufacturer, dentist or other to carry out adjustment operations prior to fitting and/or after fitting in a user's mouth. A major advantage is that the forces applied to each tooth can be individually and accurately customised for that tooth rather than the same forces being applied to all teeth.

FIG. 1 shows a portion of an orthodontic brace 10 including three adjustable orthodontic brackets 12 mounted to respective teeth 14 with an archwire 16 located in slots 18 of the adjustable brackets 12. The figure also shows a more detailed view of one of the adjustable orthodontic brackets 12 with three possible slots (the arrows A, B, C indicate viewing directions referred to in FIG. 2).

The orthodontic brackets 12 comprise a base 20 having a rear surface 22 and a front surface 24. The rear surface 22 is configured to be adhered to a surface of a tooth 14 in use. An archwire holder 26 is rotationally mounted to the front surface 24 of the base 20. The archwire holder 26 is configured to be rotatable around an axis which is substantially perpendicular to the base 20 (e.g. to within +/−30°, +/−20°, +/−10°, +/−5°, or +/−3°). In use, the archwire holder 26 may be free to rotate or constrained in a plurality of angular orientations (e.g. by a locking mechanism). The archwire holder 26 comprises a plurality of slots 18 disposed at different angular orientations relative to the axis or rotation of the archwire holder 26. Each slot 18 is configured to hold the archwire 16. The plurality of slots 18 each have a different configuration (e.g. different internal shape/orientation/angle) to apply a different amount and/or orientation of tip and/or torque to a tooth in use. The archwire holder 26 is rotated into place (and may be locked in place) to select a desired slot 18 for receiving the archwire 16 in order to apply a desired amount and/or orientation of tip and/or torque to a tooth in use.

Orthodontic brackets as described herein can be fixed to the outside/labial/buccal surface and/or the inside/lingual/palatal surface.

Figure 2:
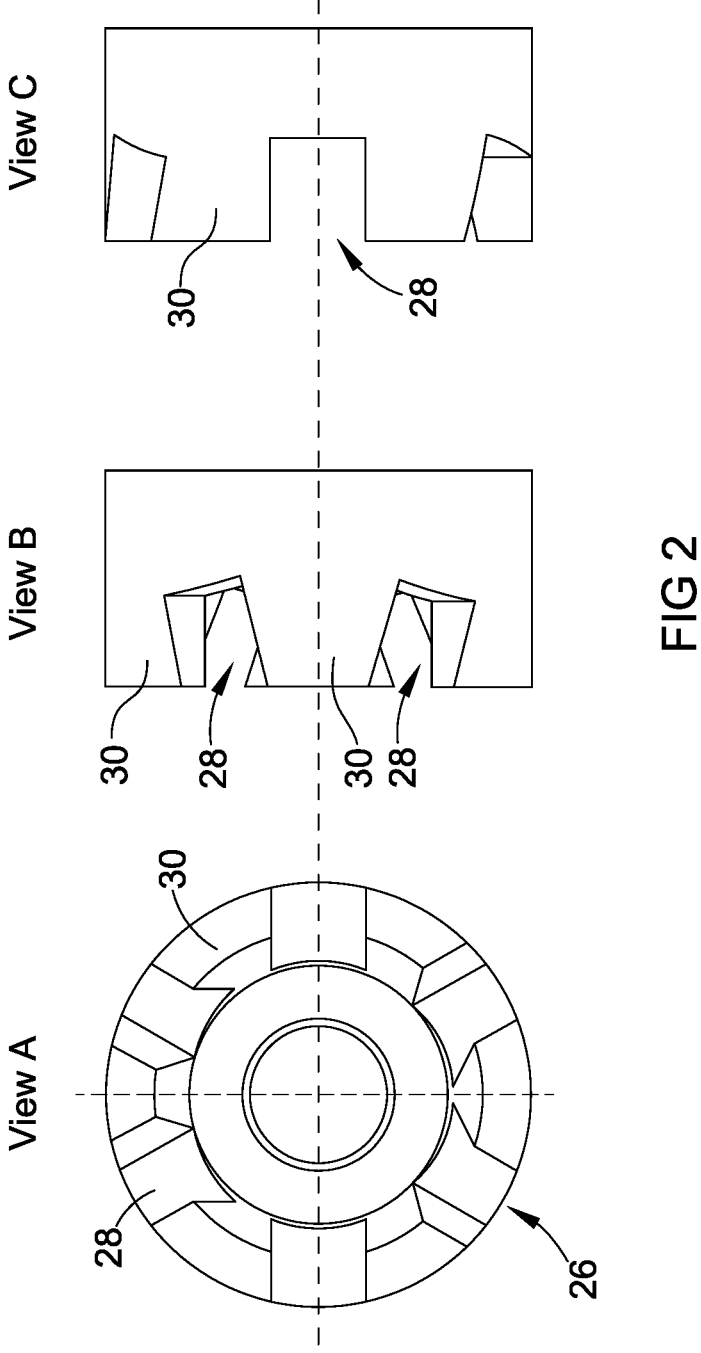
FIG. 2 shows three orthogonal views (on directions A, B and C in FIG. 1) of a rotary archwire holder component of an orthodontic bracket with three equally spaced slots, each having a different torque angle due to variations in the orientation of each slot (the archwire and base plate are not shown for clarity)

FIG. 2 shows three views of the rotary archwire holder 26 (corresponding to arrows A, B and C in FIG. 1). The rotary archwire holder includes three equally spaced slots (in terms of angular orientation), each having a different torque angle due to variations in the angle of each slot (the archwire and base plate are not shown for clarity). The rotary archwire holder 26 is cylindrical in shape and has a central hole to receive a spigot to rotationally mount the component to a base plate. The rear surface of the rotary archwire holder 26 is planar and is located adjacent a front surface of the base plate as shown in FIG. 1. The front surface of the rotary archwire holder 26 has cut-out portions 28 forming projections 30 to define the slots. The illustrated embodiment has six cut-out portions 28 which can be grouped into three pairs of opposing and aligned cut-out portions forming the three angularly oriented slots. As can be seen in View B and C of FIG. 2, the cut-out portions are twisted relative to each other which causes the archwire to twist by a set amount when disposed in one of the slots. This twisting causes a torqueing force to be applied to an associated tooth in use. The illustrated rotary archwire holder 26 can provide five different settings for torque: one of the slots is neutral (zero torque); each of the other two slots have a non-zero torque setting which can be positive or negative according to the 180° orientation of the rotary archwire holder 26. The slot angles to change the torque settings may be at any angle to suit the prescription.

Figure 3:
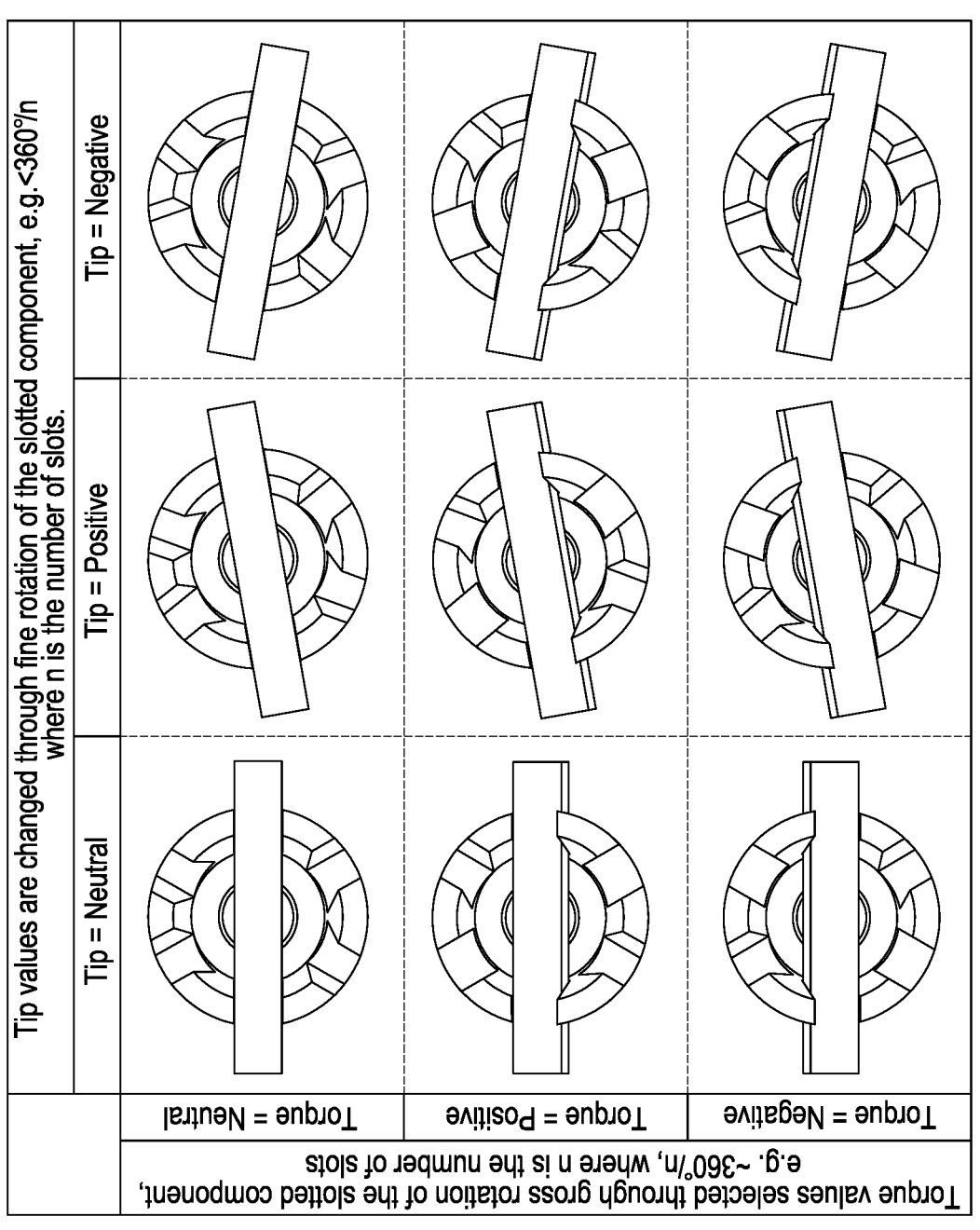
FIG. 3 shows a matrix illustrating various combinations of tip and torque that can be applied for the case of three torque values that can be selected by selecting different slots and three tip values provided by three different fine rotation orientations provided for each slot (less or more combinations can be provided by designing in a lower or greater number of tip and torque values according to the number of slots provided and the number of fine rotation positions available for each slot)

FIG. 3 shows a matrix illustrating various combinations of tip and torque that can be applied for the case of three torque values that can be selected by selecting different slots and three tip values provided by three different fine rotation orientations provided for each slot. Two further torque settings can be available for this rotary archwire holder design but have not been shown in FIG. 3. Less or more combinations can be provided by designing in a lower or greater number of tip and torque values according to the number of slots provided and the number of fine rotation positions available for each slot.

Figure 4:
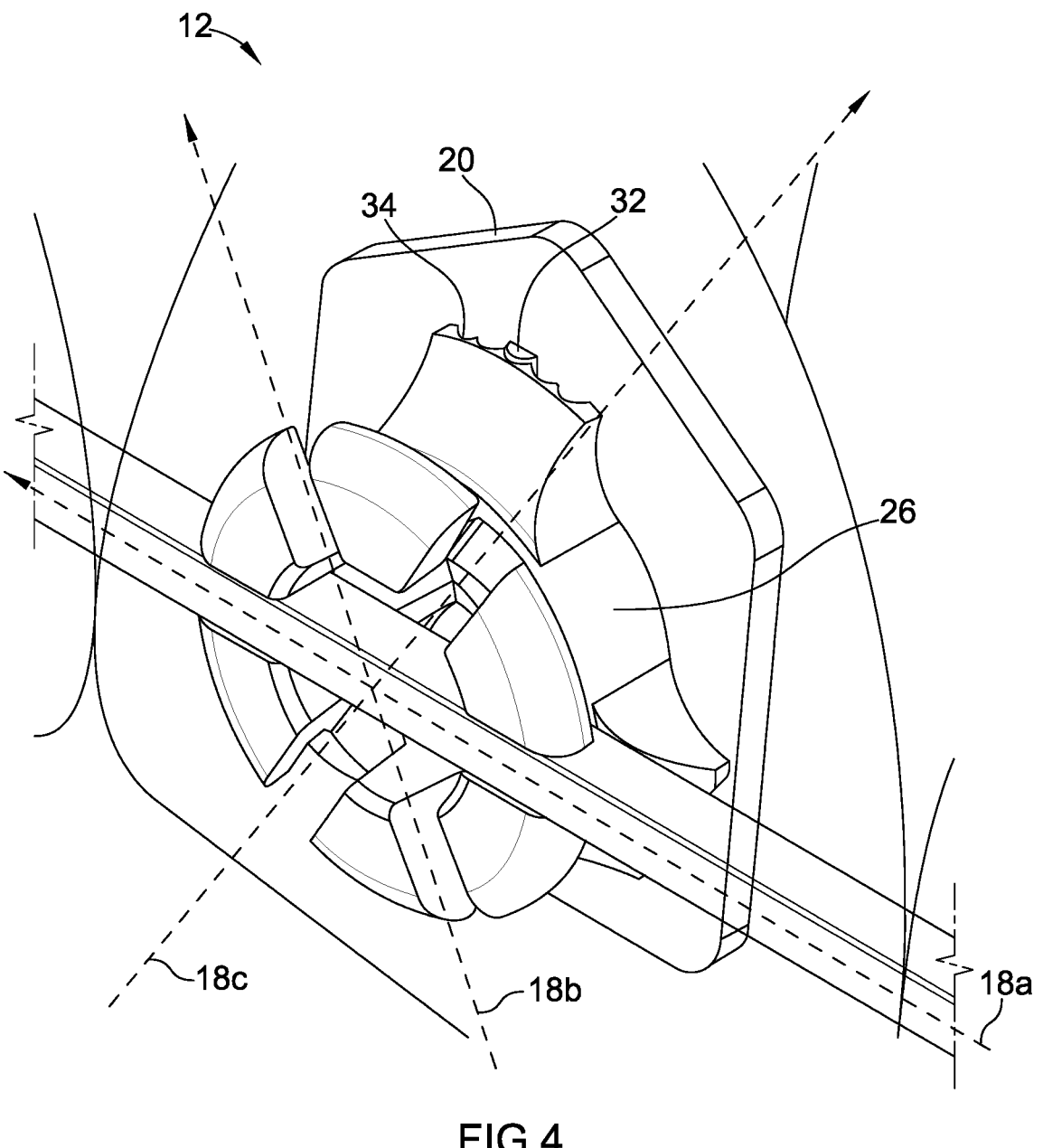
FIG. 4 shows an adjustable orthodontic bracket in more detail comprising three slots each set at different angles for three different torque settings and five fine rotation positions providing five different tip setting for each of the three torque settings; a central spigot forms the rotational axis and retention mechanism between the base and the rotating archwire holder part; in this version protrusions on the base engage with recesses in the rotary component to form clickable locking positions to facilitate the selection of tip and torque settings (an archwire retainer component over the rotary archwire holder is not shown for clarity)

FIG. 4 shows an adjustable orthodontic bracket 12 in more detail comprising three slots (18a; 18b; 18c) having different internal shapes for three different torque settings. Five fine rotation positions providing five different tip settings for each of the three torque settings are provided. A central spigot (not visible) forms the rotational axis and retention mechanism between the base 20 and the rotating archwire holder part 26. In this version, protrusions 32 on the base 20 engage with recesses 34 in the rotary component 26 to form clickable locking positions to facilitate the selection of tip and torque settings (an archwire retainer component over the rotary archwire holder is not shown for clarity).

Figure 5:
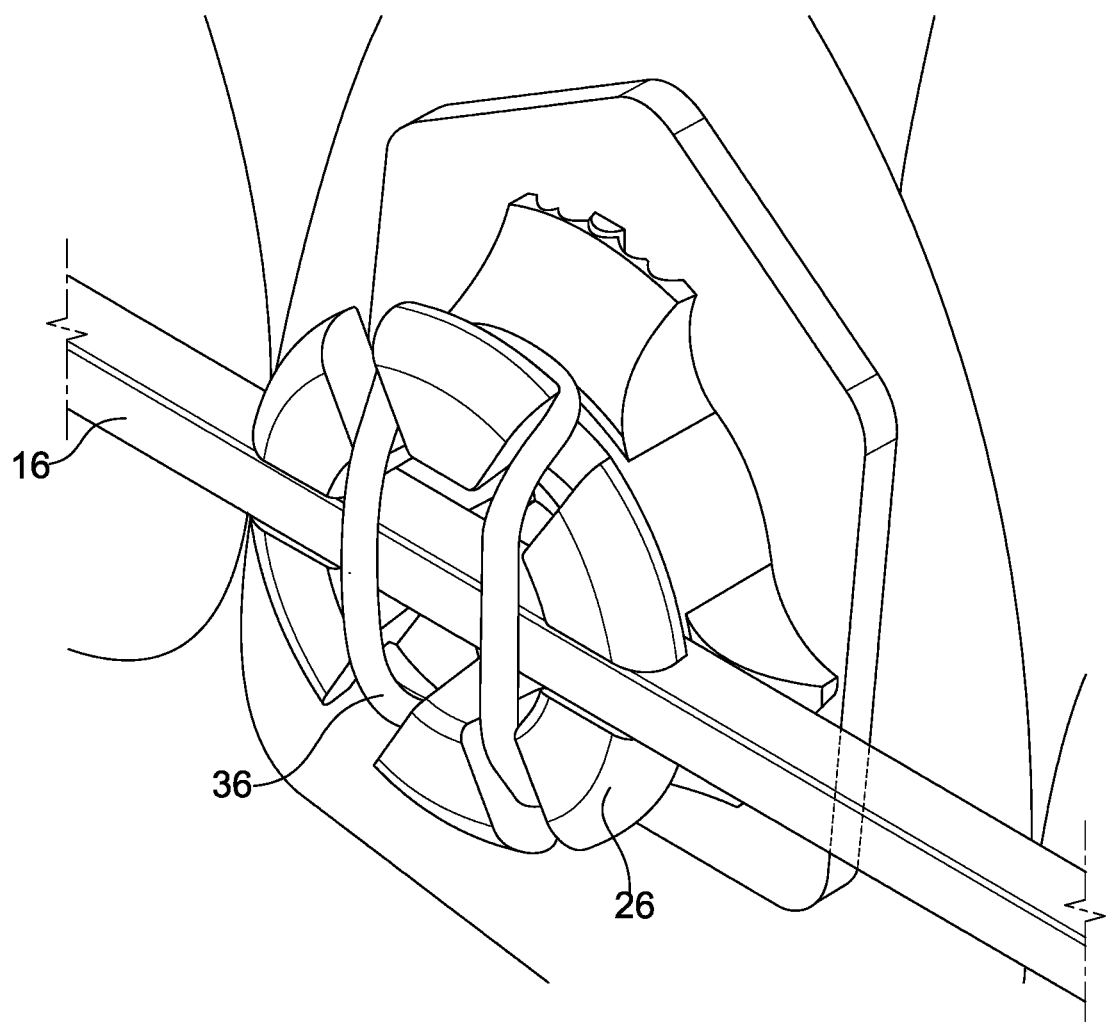
FIG. 5 shows the orthodontic bracket of FIG. 4 with an archwire retainer in the form of a polymer band to illustrate how ligation of the archwire into the archwire holder can be achieved.

FIG. 5 shows the orthodontic bracket of FIG. 4 with an archwire retainer 36 in the form of a polymer band to illustrate how ligation of the archwire 16 into the archwire holder 26 can be achieved.

Figure 6:
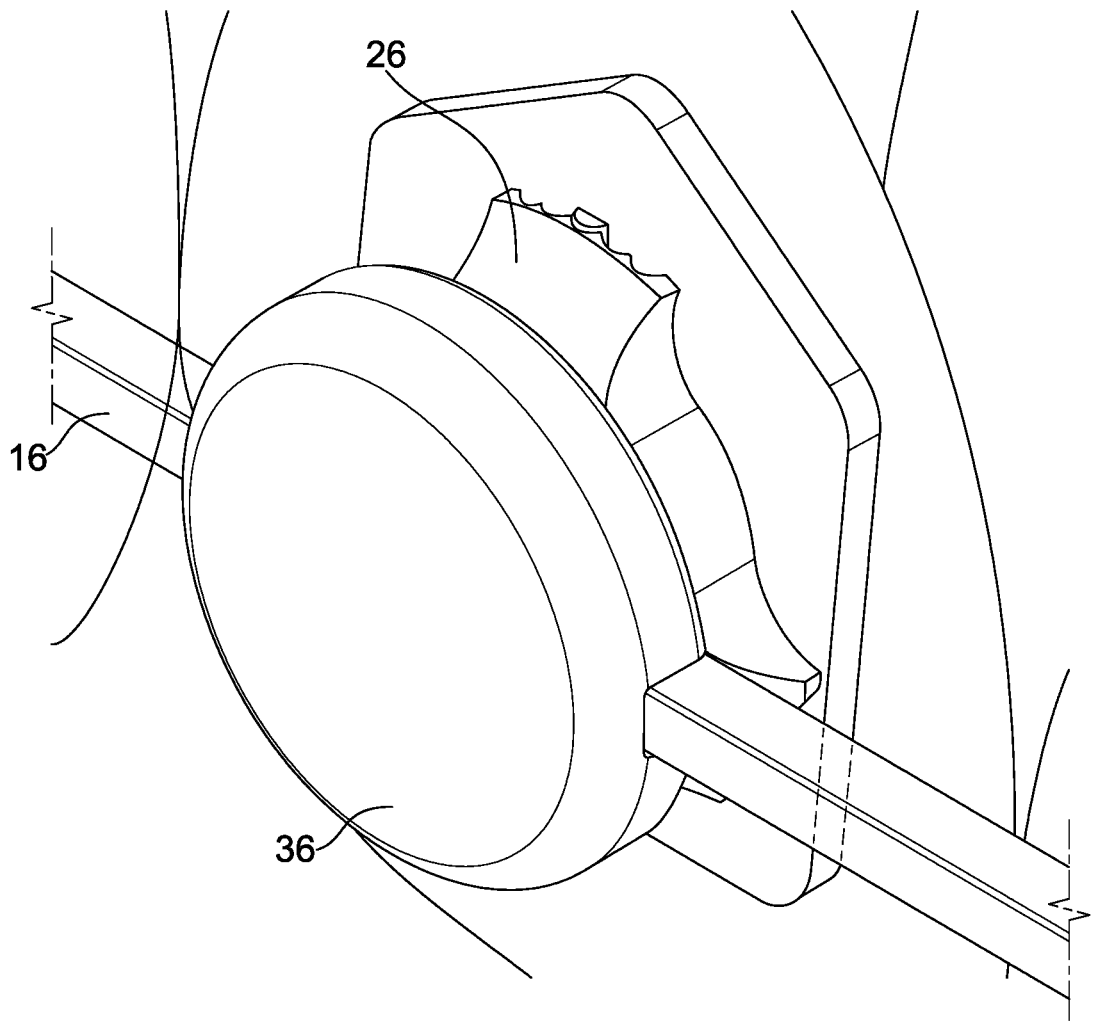
FIG. 6 shows the orthodontic bracket of FIG. 4 with an archwire retainer in the form of a snap-on cap to achieve an alternative method of ligation of the archwire into the archwire holder.

FIG. 6 shows the orthodontic bracket of FIG. 4 with an archwire retainer 36 in the form of a snap-on cap to achieve an alternative method of ligation of the archwire 16 into the archwire holder 26.

Figure 7:
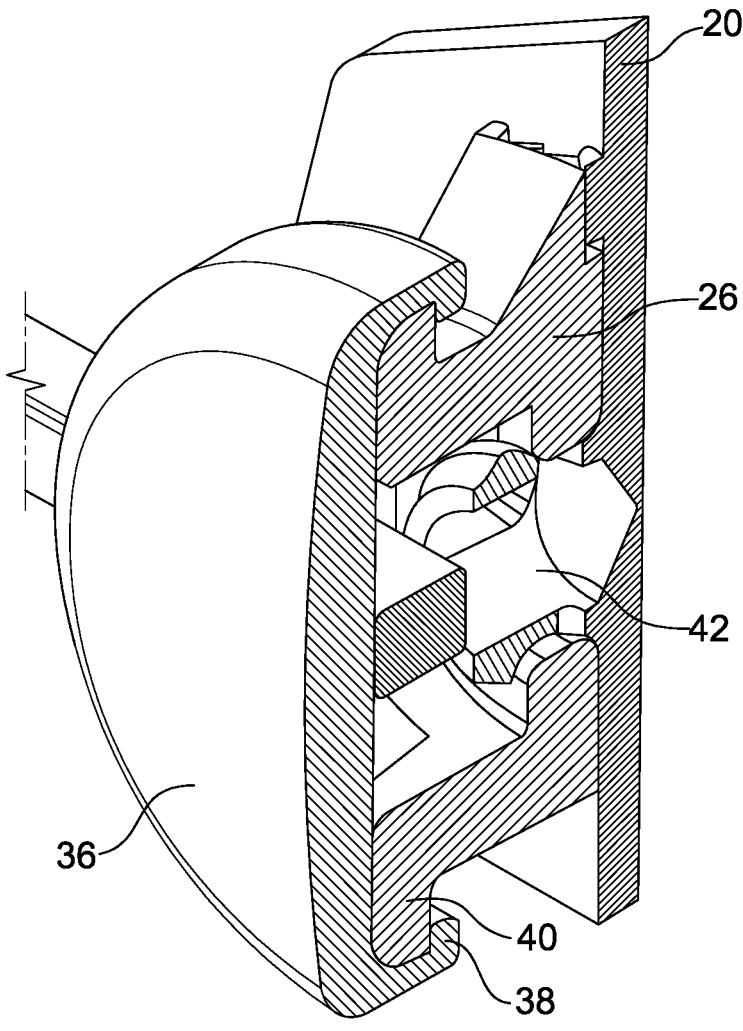
FIG. 7 shows a cutaway section of the orthodontic bracket of FIG. 6; the cap may be colourised or patterned to help camouflage or decorate the device.

FIG. 7 shows a cutaway section of the orthodontic bracket of FIG. 6 including a snap-on cap 36 to retain the archwire 16 within the archwire holder 26. The cap 36 includes a peripheral lip 38 which fits over, and couples with, a complimentary lip 40 on the rotary archwire holder 26. The cap 36 may be colourised or patterned to help camouflage or decorate the device. Also visible in the cutaway view of FIG. 7 is the central spigot 42 for rotationally coupling the rotary archwire holder 26 to the base 20.

Figure 8:
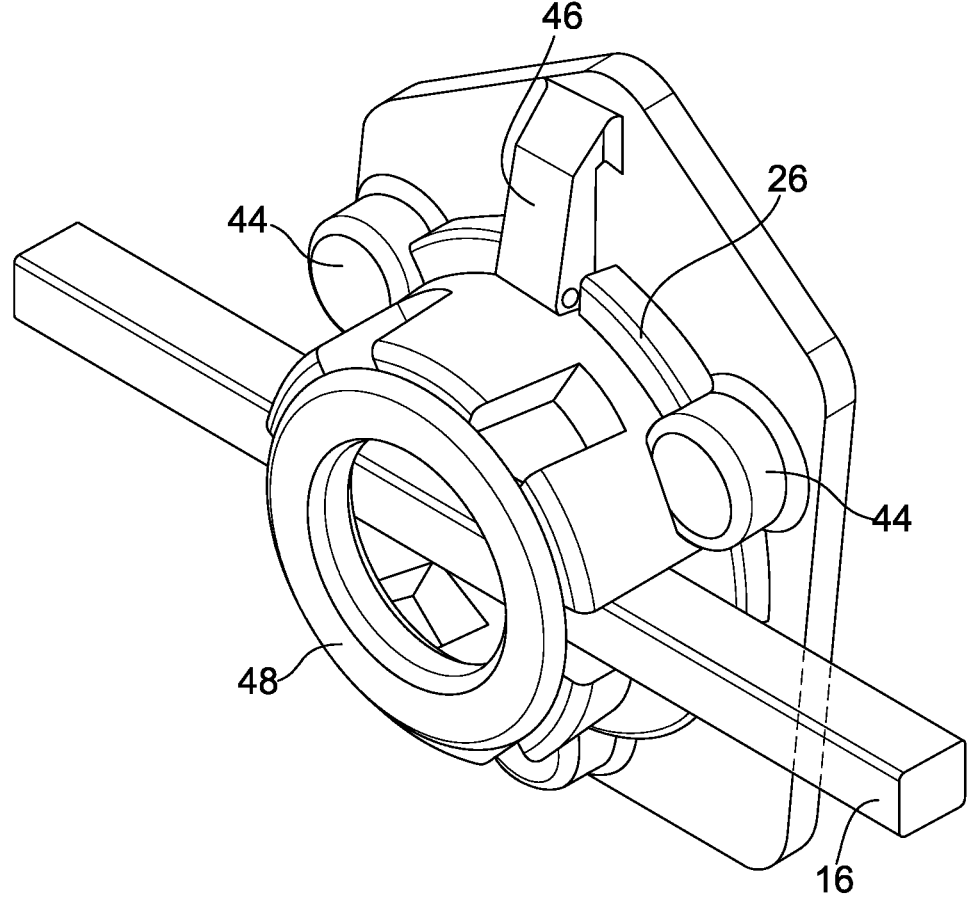
FIG. 8 shows an orthodontic bracket configuration including: external rotary constraints and retention as an alternative to a central spigot; a spring clip locking part to maintain the rotary part in the required rotational orientation; and an alternative ligation snap-on ring to retain the archwire in a slot of the rotary archwire holder.

FIG. 8 shows an orthodontic bracket configuration including external rotary constraints 44 for rotationally mounting the archwire holder 26 as an alternative to a central spigot. The illustrated configuration also comprises a spring clip locking part 46 to maintain the rotary part 26 in the required rotational orientation. Further still, the illustrated arrangement also has an alternative ligation snap-on ring 48 to retain the archwire 16 in a slot of the rotary archwire holder 26. One or more of these alternative rotational, locking, and archwire retention configurations may be combined with features of the earlier described orthodontic bracket configurations.

Figure 9:
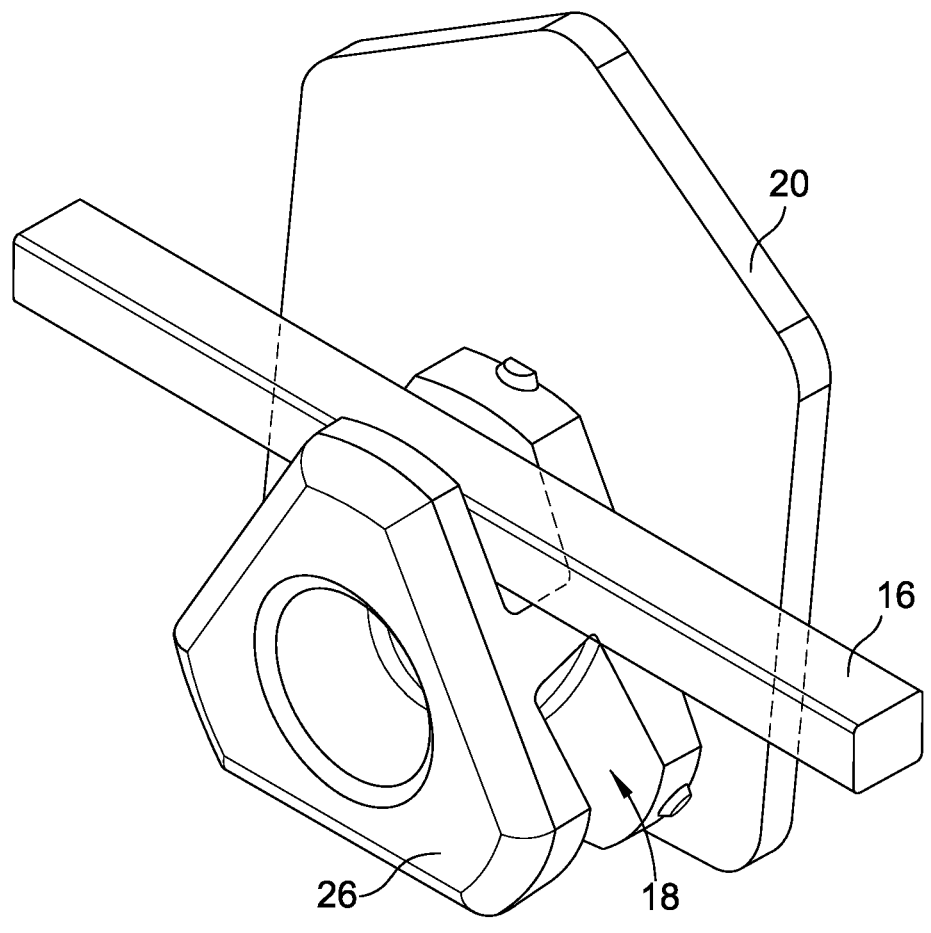
FIG. 9 shows an orthodontic bracket configuration including slots that engage the archwire in a plane approximately parallel to the base and tooth; the illustrated arrangement provides three slots enabling three variations of torque to be selected, although other variations with less or more slot variations can be envisaged.

FIG. 9 shows a yet another orthodontic bracket configuration including an archwire holder 26 which has slots 18 that engage the archwire 16 in a plane approximately parallel to the base 20 and associated tooth. The illustrated arrangement provides three slots 18 enabling three variations of torque to be selected, although other variations with less or more slot variations can be envisaged.

Figure 10:
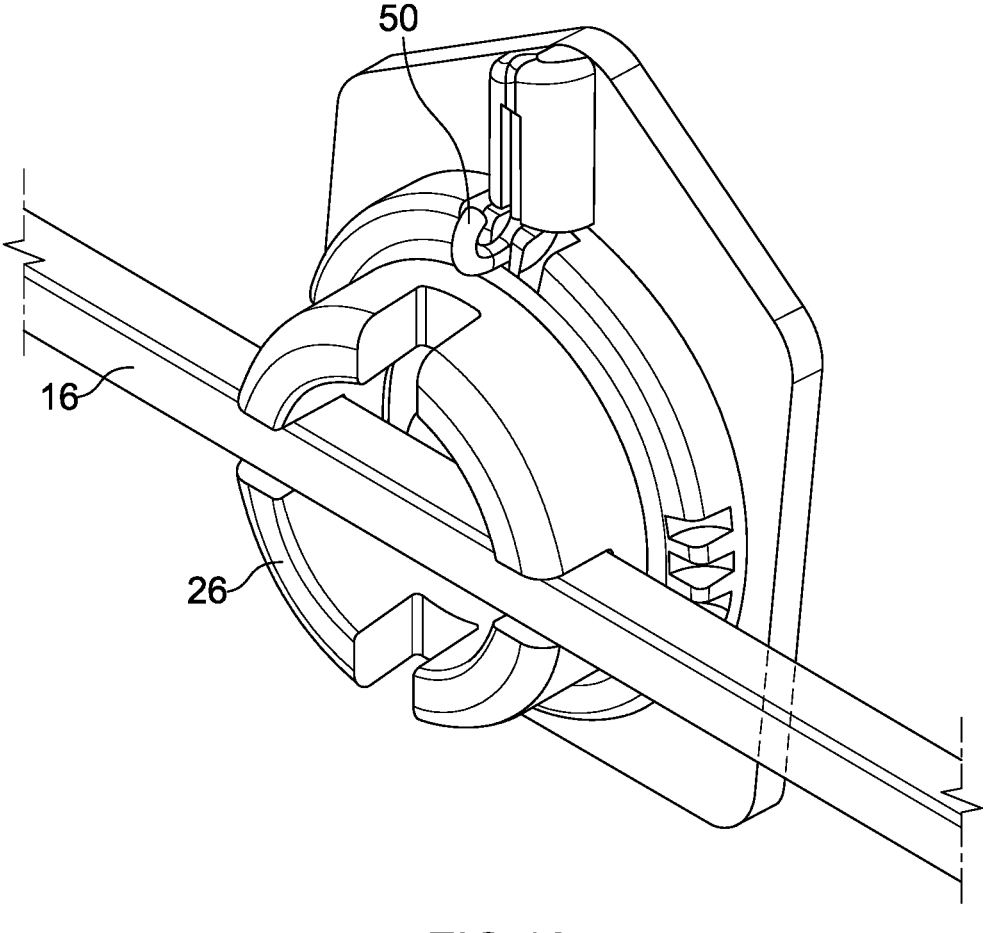

FIG. 10 shows an orthodontic bracket configuration including a rotatable archwire holder 26 including two slots for the archwire 16, in this case at 90 degrees to each other.

Each slot is formed of two sub-slots. Each slot has different torque angles giving the potential for up to four torque angles that can be selected (the two slots can be oriented in an upwards or downwards direction giving the four torque settings). A spring clip 50 is provided to positively locate the tip and torque angle selections, the illustration showing three possible tip angles for each torque setting although more or less of either or both could be designed in.

Figure 11:
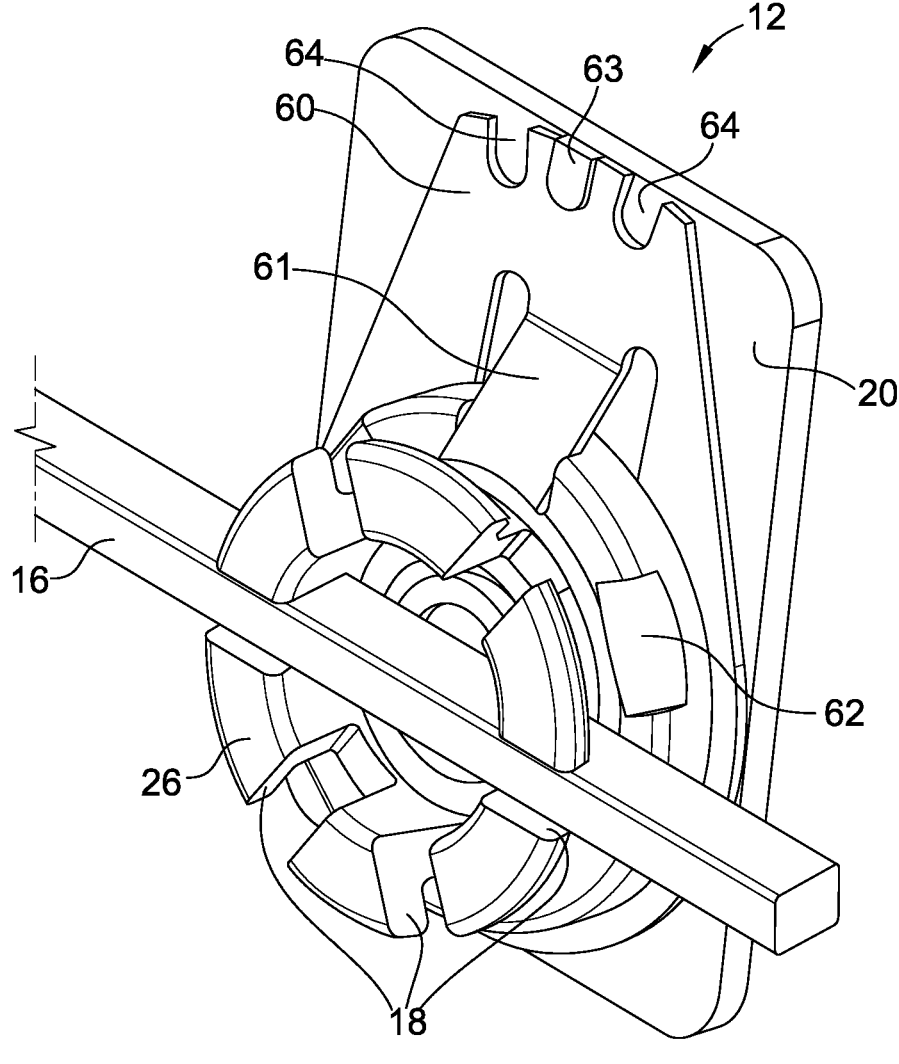
FIG. 11 shows an alternative orthodontic bracket of the invention.

FIG. 11 shows an orthodontic bracket configuration including a rotatable archwire holder 26 having three slots 18 for the archwire 16. Each slot 18 comprises two sub-slots configured to house the archwire at the same time and having the same slot angle. An archwire 16 is shown in place in a slot consisting of a pair of sub-slots in FIG. 11. Thus, in use, each slot provides a different torque force, which is secured and indexed according to clinical need by locating the tab 61 of spring 60 into cooperating recesses 62 formed in the archwire holder 26. The torque force is translated from the archwire to the tooth by the profiled (in this case rectangular) archwire 16 cooperating with the profile of the slot 18. The level of tip may be adjusted, fixed and indexed by co-locating a protrusion 63 on the base 20 with cooperating profiles 64 on the spring 60. As a variant, the protrusion may be located on the spring 60 with cooperating profiles being located on the base 20. The example shown in FIG. 11 shows three cooperating profiles corresponding to three different tip positions.

The slot in the embodiments described above may instead be formed by a slot that nevertheless performs the same function as the slot formed by two or more sub-slots.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An orthodontic bracket comprising a base and an archwire holder:
   a) the base having a rear surface and a front surface, the rear surface configured to be adhered to a surface of a tooth in use;
   b) the archwire holder having a rear holder surface and a front holder surface including a plurality of slots and a plurality of cooperating recesses,
      wherein the rear surface of the archwire holder is rotationally mounted to the front surface of the base to enable the archwire holder to rotate around a fixed axis which is perpendicular to the base to within +/−30°, and
      wherein each of the plurality of slots has a different internal angular shape to provide a different torque setting, each of the plurality of slots being configured to hold an archwire, and
   c) a releasable locking mechanism comprising a tab and a spring including a plurality of recesses or profiles, wherein the releasable locking mechanism is positioned in between the base and the archwire holder, wherein the releasable locking mechanism is configured to allow the archwire holder to be rotated around the fixed axis to position a slot of the plurality of slots and then lock in place the positioned slot,
   wherein the tab is resiliently biased against the archwire holder, the tab being configured to cooperate with a cooperating recess of the plurality of cooperating recesses on the archwire holder,
   wherein the spring is resiliently biased against the base and the plurality of recesses or profiles is configured to cooperate with cooperating components of the base and/or archwire holder; and
wherein the orthodontic bracket is configured to enable a gross rotation position and a fine rotation position,
wherein the gross rotation position establishes the amount and/or orientation of torque and a desired torque force is set by positioning a desired slot of the plurality of slots by rotating the archwire holder around the fixed axis and locking in place the archwire holder by engaging a cooperating recess of the plurality of cooperating recesses with the tab of the releasable locking mechanism, and wherein the torque force involves rotating the tooth around a substantially horizontal axis which is substantially parallel to the surface of the tooth to change the out-of-plane orientation of the long axis of the tooth, and
wherein the fine rotation position establishes the amount and/or orientation of tip and a desired tip force is set by positioning a desired recess or profile of the plurality of recesses or profiles by rotating the spring around the fixed axis and locking in place the spring by engaging the cooperating components and the tip force involves rotating the tooth around an axis substantially perpendicular to the surface of the tooth to change the in-plane orientation of a long axis of the tooth.

2. An orthodontic bracket according to claim 1, wherein the cooperating components include a protrusion on the front surface of the base and/or the rear holder surface of the archwire holder to provide clickable locking positions to lock in place the archwire holder.

3. An orthodontic bracket according to claim 1, wherein the cooperating components include a spring clip on the front surface of the base and/or the rear holder surface of the archwire to lock in place the archwire holder.

4. An orthodontic bracket according to claim 1, wherein the releasable locking mechanism comprises a plurality of rotary constraints and a spring clip on the front surface of the base and/or the rear holder surface of the archwire to lock in place the archwire holder.

5. An orthodontic bracket according to claim 1, wherein each fine rotation position of the plurality of fine rotation positions is provided for each slot of the plurality of slots.

6. An orthodontic bracket according to claim 1, wherein each slot of the plurality of slots is oriented in a direction perpendicular to the base to within +/−45° for insertion of the archwire.

7. An orthodontic bracket according to claim 1, wherein each slot of the plurality of slots is oriented in a plane parallel to the base to within +/−45° for insertion of the archwire.

8. An orthodontic bracket according to claim 1, wherein each slot of the plurality of slots is formed from two or more sub-slots aligned to receive the archwire.

9. An orthodontic bracket according to claim 1, wherein the archwire holder is configured to be free to rotate, or have its rotary position constrained by the archwire, a flexible mechanism, a positive location mechanism, a weld and/or an adhesive.

10. An orthodontic bracket according to claim 1, further comprising an archwire retainer which is disposed over the archwire holder to retain the archwire in the archwire holder in use.

11. An orthodontic bracket according to claim 10, wherein the archwire retainer is in the form of a sliding or hinged gate, retention band, ring, or snap on cap.

12. An orthodontic brace kit comprising:

a plurality of orthodontic brackets according to claim 1; and one or more archwires having a cross-sectional shape for fitting into the slots of the orthodontic brackets.

13. An orthodontic brace comprising:

a plurality of orthodontic brackets according to claim 1; and an archwire disposed in the slots of the orthodontic brackets.

14. An orthodontic bracket according to claim 1, wherein the spring is configured such that pulling the spring away from the cooperating components on the base disengages the lock.

* * * * *